United States Patent

Ellinas et al.

[11] Patent Number: 5,999,288
[45] Date of Patent: Dec. 7, 1999

[54] CONNECTION SET-UP AND PATH ASSIGNMENT IN WAVELENGTH DIVISION MULTIPLEXED RING NETWORKS

[75] Inventors: Georgios Nicos Ellinas, Long Island City; Krishna Bala, New York, both of N.Y.; Gee-Kung Chang, Holmdel, N.J.

[73] Assignee: Telcordia Technologies, Inc., Morristown, N.J.

[21] Appl. No.: 09/170,454

[22] Filed: Oct. 12, 1998

Related U.S. Application Data

[60] Provisional application No. 60/073,433, Feb. 2, 1998.

[51] Int. Cl.[6] .................................................. H04B 10/20
[52] U.S. Cl. ........................................ 359/119; 359/124
[58] Field of Search .................................. 359/119, 110, 359/124; 370/452

[56] References Cited

U.S. PATENT DOCUMENTS

| | | | |
|---|---|---|---|
| 5,548,431 | 8/1996 | Shin et al. | 359/119 |
| 5,745,269 | 4/1998 | Chawki et al. | 359/119 |

OTHER PUBLICATIONS

Multiwavelength Survivable Ring Network Architectures, authored by A.F. Elrefaie and published in the Proceedings of the International Conference in Communications (ICC), 1993.

Primary Examiner—Knife-Michael Negash
Attorney, Agent, or Firm—Joseph Giordano

[57] ABSTRACT

Techniques for physically implementing fiber ring networks which achieve full mesh connectivity, such networks including a 2-fiber WDM ring network composed of a clockwise ring and counter clockwise ring, and a 4-fiber WDM Self-Healing Ring network. The number of wavelengths required is derived for both odd and even number of nodes on the ring. To physically set-up all required connections in the network, optimal wavelength assignment algorithms are devised so that the wavelength assignment between nodes on the ring is systematic and engenders full mesh connectivity while avoiding any possible violation of the color clash constraint. An illustrative algorithm uses a simple matrix approach for calculating the interconnection arrangement.

17 Claims, 8 Drawing Sheets

CONNECTION SET-UP AND PATH ASSIGNMENT IN WAVELENGTH DIVISION MULTIPLEXED RING NETWORKS

CROSS-REFERENCE TO RELATED APPLICATION

This a nonprovisional application of provisional application Ser. No. 60/073,433, filed Feb. 2, 1998.

BACKGROUND OF THE DISCLOSURE

1. Field of the Invention

This invention relates to fiber telecommunication systems and, more particularly, to techniques for optimally selecting appropriate paths and setting-up connections in wavelength division multiplexed ring networks by assigning the minimum number of wavelengths that preclude color clash violations and implement shortest path routing.

2. Description of the Background Art

In today's integrated networks, it is essential that a single communications medium be able to handle traffic with different characteristics, operating in the range of a few Mb/sec to a few Gb/sec. This will enable the networks to handle such applications as large volume data or image transfers (e.g., supercomputer interconnections, supercomputer visualization, and high resolution uncompressed medical images) that have very large bandwidth requirements, as well as such applications as voice or video which require much smaller bandwidth.

The enormous potential of optical fiber to satisfy the demand for these networks has been well established over the last few decades. Optical fiber is highly reliable (Bit Error Rate (BER) in commercially deployed systems less than $10^{-11}$), it can accommodate longer repeater spacing, and it has unlimited growth potential. Single mode fiber offers a transmission medium with Tb/sec bandwidth (enough capacity to deliver a channel of 100 Mb/sec to hundreds of thousands of users), combined with high speed transmissions experiencing low loss and low bit error rates. Traditional network architectures, however, which use electrical switches and the optical fiber as a simple substitute for copper wire or other communications media, are limited by an electronic speed bottleneck and cannot be used in current networks with a growing demand for Gb/sec applications. As the next step in the evolution of the existing transport networks, Wavelength Division Multiplexed (WDM) optical networks can be deployed to provide concurrency by multiplexing a number of wavelengths for simultaneous transmission within the same medium. This approach then provides each user with a manageable portion of the enormous aggregate bandwidth.

Rapid advances in optical fiber communications technology and devices (such as filters, multiplexers/demultiplexers, fiber couplers, optical switches, multiwavelength amplifiers, Wavelength Add/Drop Multiplexers (WADM's) and Wavelength Selective Cross-connects (WSXC's)), in terms of performance, reliability and cost over the last few years, enable the future deployment of optically routed WDM networks which can be used to create high capacity nationwide broadband networks. In these networks, optical signals can flow end-to-end between users, without being converted to electrical signals at the network switches. They can offer large bandwidth, simple cross-connecting of high bit-rate streams, signal format and bit rate independent clear channels, equipment and operational savings, as well as maximum flexibility. WDM components and (mostly point-to-point) networks are currently been manufactured by a number of companies.

The WDM optical networks are envisioned to be used as transport networks for a number of technologies such as Synchronous Optical Network (SONET), Synchronous Digital Hierarchy (SDH), and Asynchronous Transfer Mode (ATM) as well as to provide end-to-end clear channels between users. Various applications utilizing these technologies or the optical network directly (clear channels) can then be provided.

An illustrative example of a WDM network is a self-healing WDM ring. Such a ring is a leading candidate architecture for high capacity local exchange carrier networks because of the survivability capabilities that the ring provides and the fact that its capacity can be shared by all the network nodes connected to the ring.

Figure 1:
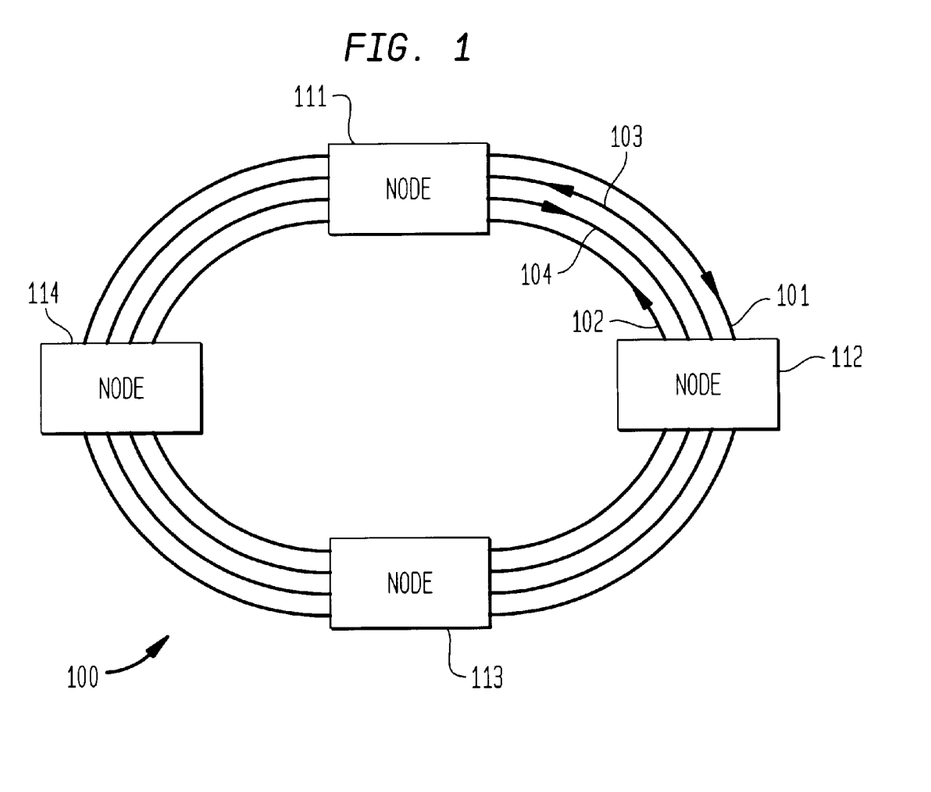
FIG. 1 illustrates a conventional four node, bi-directional 4-fiber shared protection self-healing ring architecture having four fibers (2 working fibers in opposite directions and 2 protection fibers in opposite directions) connecting each adjacent pair of nodes representative of ring technology.

The ring network of FIG. 1 depicts an example of a self-healing ring architecture, namely, a so-called 4-fiber WDM shared protection ring 100. Two of the fibers are used as "working" fibers (carrying the network traffic) and the other two are used as "protection" fibers (dark—used only during a failure in order to restore the service). Since there are two working fibers available and the connections are always routed via shortest paths, every working fiber carries only half of the optical signal traffic on the ring. For instance, given a clockwise working fiber ring 101, a counterclockwise working fiber ring 102, along with corresponding protection fiber rings 103 and 104, the optical signal traffic from network node 111 to network node 112 can be carried in the clockwise working ring 101 and, conversely, the optical signal traffic from network node 112 to network node 111 can be carried by counterclockwise ring 102. To recover from fiber cut failures or network node failures, each operational node provides a loop-back protection switching function so that traffic on a working ring can be diverted to a protection ring to bypass the failure.

The subject matter of the present invention deals with a general ring architecture which is composed of a clockwise working ring and a counterclockwise working ring; a self-healing ring is but one example of the general principles in accordance with the present invention.

In assigning wavelengths to carry the optical signals, it is necessary to ensure that optical signals simultaneously sharing a single fiber have different wavelengths; otherwise, a so-called Color Clash (CC) occurs or, expressed equivalently, there would be in violation of the CC constraint.

In addition, it is also important practically to deploy a minimum number of wavelengths in implementing the ring network. Each additional wavelength typically requires electro-optical equipment (e.g., an optical network card including a laser) to be added in each node, thereby increasing not only the cost of connection set-up in the network but the costs of provisioning and maintenance of the network as well.

In the past, ad hoc procedures have been devised in an attempt to assign wavelengths to the required connections in the network so as to avoid Color Clash violations. As suggested, these procedures are not systematic nor scalable. These methods are not systematic because the techniques rely upon trial-and-error attempts to produce a viable wavelength assignment for a given interconnection configuration, for a given number of nodes in the ring. These methods are not scalable in the sense that if it is desired to add another node to the network with minimal disruption to the interconnections of the already-present nodes, there is no known prior art technique for adding this node in an orderly or systematic way while ensuring use of the minimum number of wavelengths, shortest path routing, and avoidance of a Color Clash. In contrast, in accordance with the present invention, the scaling technique for adding two nodes results in no disruptions, whereas the scaling technique for adding one node results in disturbing a very small number of existing connections.

A reference representative of the technological field of the present invention which discusses the ad hoc technique is the article entitled "Multiwavelength Survivable Ring Network Architectures", authored by A. F. Elrefaie and published in the Proceedings of the International Conference in Communications (ICC), 1993. Whereas this reference does address the issue of determining the minimum number of wavelengths to avoid violation of the CC constraint (for the case of odd nodes on the ring only), an ad hoc technique for assigning wavelengths to all connections on the ring is presented, which is only satisfactory for situations in which the number of nodes on the ring is an odd number. This reference does not address the case when the number of nodes on the ring is an even number. Moreover, the ad hoc method does not address a procedure for the systematic determination of wavelength assignment, nor a systematic procedure for assigning wavelengths when the ring network scales.

Thus, a need exists in the art for a systematic procedure to implement a wavelength assignment in a ring network with a minimum number of wavelengths, for either an even or odd number of nodes, in accordance to shortest path routing and without a Color Clash. Furthermore, a need exists in the art for a systematic method to assign wavelengths to the network connections whenever it is desirable/necessary to add nodes to the network.

SUMMARY OF THE INVENTION

These shortcomings and other limitations and deficiencies are obviated in accordance with the present invention by a wavelength assignment and routing approach that is systematic, can handle either an even number or an odd number of nodes, is scalable, and which precludes Color Clash violations.

In accordance with the present invention, the point of departure considers the routing and wavelength assignment problem for a single 4-fiber shared protection self-healing ring, which was initially approached from the static point of view. The assumptions are that a sufficient number of wavelengths are available for full mesh connectivity on the ring, and that each node on the ring communicates with each other on the ring with a single wavelength. Given these assumptions, one preferred technique (matrix algorithm) calculates the wavelengths assigned to each connection in advance and, if full mesh connectivity is required, assigns the wavelengths to all connections as specified by the matrix. Similarly, if partial connectivity is required, when a connection request arrives, the algorithm finds the shortest path route and assigns the wavelength specified in the matrix for this connection. Since enough wavelengths are available for full mesh connectivity and each connection does not require more than one wavelength, this matrix-driven technique will always work for both static full mesh connectivity or dynamic (on-the-fly) partial connectivity. Moreover, once connection set-up in the network has been established, shortest path routing over the network is immediately realizable.

In accordance with the broad aspect of the present invention, a method is set forth for physically implementing a wavelength division multiplexing network composed of clockwise and counterclockwise rings and interconnecting nodes via specific wavelengths. The method includes the steps of (1) systematically selecting, based upon a prescribed mathematical algorithm, a wavelength assignment for each of the node pair connections, the algorithm being determined to satisfy known grade-of-service constraints for the network, such as minimizing the number of wavelengths, and scaling the network while minimizing the disruption to the existing connections, and (2) interconnecting each node pair with the corresponding assigned wavelength.

In accordance with yet another aspect of the present invention, once the connection set-up in the network has been established using the prescribed algorithm, routing of traffic over the network is effected via shortest path routing.

BRIEF DESCRIPTION OF THE DRAWINGS

The teachings of the present invention can be readily understood by considering the following detailed description in conjunction with the accompanying drawings, in which:

FIG. 2A illustrates wavelength assignment for a simple network with three nodes (clockwise direction only), whereas

To facilitate understanding, identical reference numerals have been used, where possible, to designate identical elements that are common to the figures.

DETAILED DESCRIPTION

After considering the following description, those skilled in the art will clearly realize that the teachings of this invention can be readily utilized in providing Wavelength Division Multiplexing services, including wavelength assignment, either statically or dynamically, as well as shortest path routing over the configured network.

First, the minimum number of wavelengths required for such a ring, differentiating between the cases of odd and even number of nodes on the ring, is elucidated.

Next, an illustrative embodiment of an optimal wavelength assignment technique, based on a matrix approach, is discussed; this technique assigns the minimum number of wavelengths required to all connections on the ring so that there is no Color Clash. Again, the cases of odd and even number of nodes on the ring are solved separately. The scalability of the technique is then covered.

Finally, an alternative embodiment of an optimal wavelength assignment scheme, based on a modular approach, which also ensures no Color Clash violations, is discussed, along with scaling considerations.

Connection Set-up Characteristics

The following characteristics summarize the manner in which the wavelength division multiplexing network is optimized:

(1) deploys the minimum number of wavelengths for full mesh connectivity, without violating the Color Clash constraint, wherein full-mesh connectivity means that each node in the network is directly connected to each of the other nodes;

(2) routing is via the shortest path (if the number of nodes is odd, there is only one shortest path to most distant node; if the number of nodes is even, then there are two shortest paths to the most distant node, and one is selected);

(3) one dedicated wavelength per connection.

The full import of these characteristics will be covered in detail in the sequel.

First, pedagogically, it is instructive to understand wavelength assignment from an overview perspective, as well as the incremental changes to a given ring as it is scaled, that is, as nodes are added. To this end, reference is made to FIG. 2A wherein is shown the wavelengths assignments for a ring with N=3 nodes. One wavelength, namely, $W_1$, suffices to interconnect the three nodes (note that only the clockwise direction is shown and the other three connections (not shown) use the same wavelength in the other direction (using the second fiber)). With reference to FIG. 2B, there are shown the new connections as the number of nodes in the network increases from N=3 to N=5 nodes. Now, two more wavelengths, namely $W_2$ and $W_3$, are needed to effect full mesh connectivity.

I. Number of Wavelengths Required for Full Mesh Connectivity

For an N-node ring, each node, i, is connected to all other (N−1) nodes on the ring via shortest path routes. The direction chosen for each connection (clockwise or counterclockwise) is the determining factor for the shortest path route. Since the network is symmetric, all the analysis done in one direction can be applied to the other direction as well. The analysis differentiates between the cases of odd and even number of nodes attached to the ring.

I.1 Odd Number of Nodes on the Ring (N=$N_{odd}$)

In order to find the minimum number of wavelengths required for full mesh connectivity, while observing the Color Clash constraint, a calculation of the maximum number of connections that share a single fiber, in a single direction, is required. This in turn will equal the minimum number of wavelengths required to complete all connections without violating the Color Clash constraint. Since the shortest route is always chosen, the longest path for interconnecting any two nodes equals $$\left(\frac{N_{odd}+1}{2}\right)-1$$

segments of the ring wherein a segment is now specifically defined as a link between two adjacent nodes on the ring. Therefore, at most $(N_{odd}+1)/2$ nodes will share a common fiber. The minimum number of wavelengths, $W_{odd}$, required for full connectivity is thus given by:

$$W_{odd}=(N_{odd}^2-1)/8. \qquad (1)$$

I.2 Even Number of Nodes on the Ring (N=$N_{even}$)

In this case, when choosing the shortest route, the longest path for interconnecting any two nodes equals $$\left(\frac{N_{even}}{2}\right)$$

segments of the ring. Therefore, at most $$\left(\frac{N_{even}+2}{2}\right)$$

nodes will share a common fiber. A sufficient number of wavelengths (i.e., upper bound), $W_{even}$, required for full mesh connectivity is thus given by:

$$W_{even}=((N_{even}+1)^2-1)/8. \qquad (2)$$

The $N_{even}$ case requires as many wavelengths as the "next odd" ($N_{even}+1$) case. While equation (2) assumes that all shortest path connections are allocated in a single direction, a new expression can be found by taking into consideration the fact that when there are an even number of nodes on the ring, the shortest path for the longest connections can be in either direction. The analysis differentiates between the case where $$\left(\frac{N_{even}}{2}\right)$$

is an even number, i.e., the number of nodes on the ring is divisible by 2 and 4, (called the $N_{even}^e$ case) and the case where $$\left(\frac{N_{even}}{2}\right)$$

is an odd number, i.e., the number of nodes on the ring is divisible by 2 but not divisible by 4, (called the $N_{even}^o$). For these cases, full mesh connectivity can be achieved with a number of wavelengths given by equations (3) and (4), respectively:

$$W_{even}^e=(N_{even}^e)^2/8 \qquad (3)$$

$$W_{even}^o=(N_{even}^o+4)^2/8. \qquad (4)$$

It is also readily shown that the minimum number of wavelengths required ($W_{odd}$, $W_{even}^e$ and $W_{even}^o$, respectively) is also the sufficient number of wavelengths for full mesh connectivity without violating the Color Clash constraint.

II. An Illustrative Optimal Wavelength Assignment Alorithm

An illustrative optimal wavelength assignment algorithm is devised that assigns the minimum number of wavelengths to all connections in order to achieve full mesh connectivity for the ring while avoiding violating the Color Clash constraint. The algorithm is based upon a matrix approach, as now elucidated. The columns of the matrix represent the nodes on the ring and the rows represent the wavelengths required for each connection from a node to every other node. By appropriately filling in the matrix, while following some simple rules, an optimal wavelength assignment can be obtained. An explanation of how the algorithm works for the case of an odd and even number of nodes attached to the ring is now presented.

II.1 Case 1: Odd Number of Nodes on the Ring

Matrix Definitions for $N=N_{odd}$:

1.) The matrix is of size ($N_{odd} \times W_{odd}$) where $W_{odd}$ is the number of wavelengths calculated using equation (1), and $N_{odd}$ is the number of nodes in the network.

2.) The values placed in the matrix range from 1 to $L_{max}$, where $L_{max}=(N_{odd}-1)/2$ represents the longest connection between any two nodes on the ring via shortest path routing.

3.) A value K in position (i,j) states that node j is connected to node (j+K)mod ($N_{odd}$) using wavelength $W_i$ (including wrap-around (from the last matrix column back to the first one)).

4.) The symbol X in position (i,j) states that wavelength $W_i$ is not used for any of the connections starting from node j.

The values placed in the matrix represent the connections, on one direction only, from each node to every other node (representing half of the total number of connections). In order to fill in the matrix, a specific set of rules has to be followed; these rules are:

1.) In a row: After inserting the number K in the matrix, (K−1) spaces are left empty following that number (including wrap-around), i.e., if the number K is placed at position (i,j) (wavelength $W_i$ connects node j to node (K+j)mod($N_{odd}$)), then positions (i,((j+1)mod $N_{odd}$)), . . . , (i,(j+(K−1))mod $N_{odd}$) will be empty (X's are placed at those positions to indicate that they cannot be used)). These positions cannot be used because that would result in two connections with intersecting paths using the same wavelength, thus violating the Color Clash constraint.

2.) In a column: No two entries i and j can exist where i=j. Since each number represents the number of "hops" in a connection, by having the same number in a single column, a node repeats the same connection using different wavelengths. This contradicts the original assumption that there is a single connection between any two nodes with a dedicated wavelength assigned to that connection.

3.) In a column: The whole range of numbers $1, \ldots, L_{max}$ is used. Since these entries correspond to the "connection hops", (i.e., if the number 2 appears in column 1, it signifies a connection between node 1 and node 3), this rule guarantees that each node is connected with all other nodes (on one direction only) and thus full mesh connectivity is supported. Note that since this is a bi-directional ring, a node communicates with the remaining ($N_{odd}-1)/2$ nodes on the fiber going in the opposite direction.

4.) In a row: Summation of all the values in a row equals $N_{odd}$. This rule ensures that each wavelength is fully utilized since it is used on all segments on the ring exactly once.

Rules 1–4 described above ensure that the Color Clash condition is not violated; there exist no multiple connections between nodes; all connections are assigned a distinct wavelength; and each wavelength is fully utilized. Clearly, if the matrix defined above can be filled following these rules, an optimal wavelength assignment supporting full mesh connectivity is obtained. This is true, since the size of the matrix implies that the minimum number of wavelengths required, $W_{odd}$ is used.

Figure 3:
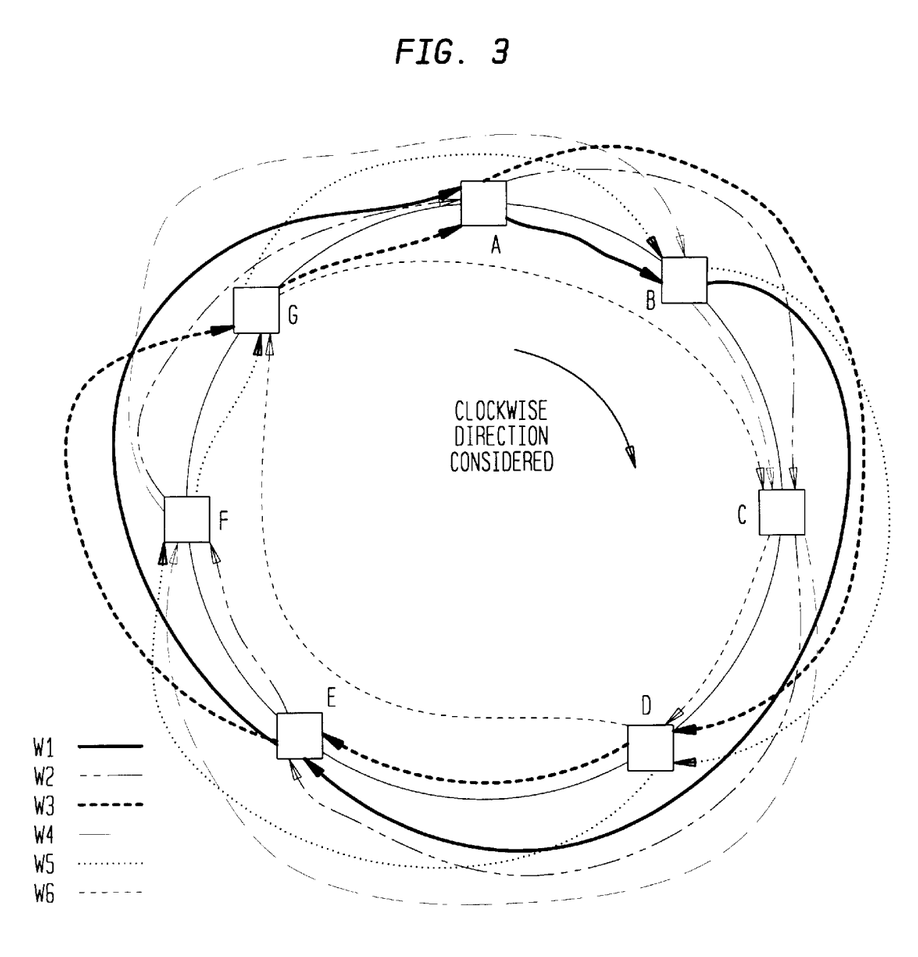
FIG. 3 illustrates the wavelength assignments (in clockwise direction only) for a seven node network using the matrix assignment algorithm.

A simple way to fill in the matrix is by cyclically shifting the matrix entries by one for each column, i.e., placing entries $1, 2, \ldots, L_{max}$ in the first column, entries $L_{max}, 1, 2, L_{max}-1$ in the second column and so on. TABLE I shows an example of a matrix for odd size ring networks ($N_{odd}=7$). In the case of $N_{odd}=7$ nodes, $W_{odd}=6$ wavelengths are required and the longest connection is $L_{max}=3$. The entries for the columns of the matrix follow a cyclic shift as explained above. FIG. 3 shows the wavelength assignment obtained from the matrix.

TABLE I

|       | A | B | C | D | E | F | G |
|-------|---|---|---|---|---|---|---|
| $W_1$ | 1 | 3 | X | X | 3 | X | X |
| $W_2$ | 2 | X | 2 | X | 1 | 2 | X |
| $W_3$ | 3 | X | X | 1 | 2 | X | 1 |
| $W_4$ | X | 1 | 3 | X | X | 3 | X |
| $W_5$ | X | 2 | X | 2 | X | 1 | 2 |
| $W_6$ | X | X | 1 | 3 | X | X | 3 |

A second example is shown in Table II for the case of $N_{odd}=11$ nodes. Again a cyclic shift approach is used to fill in the matrix. The corresponding wavelength assignment graph is not shown here because of the large number of wavelengths ($W_{odd}=15$) required for full mesh connectivity. It is easy to recognize though that given the corresponding matrix, the wavelength assignment becomes a trivial exercise.

TABLE II

|          | A | B | C | D | E | F | G | H | I | J | K |
|----------|---|---|---|---|---|---|---|---|---|---|---|
| $W_1$    | 1 | 5 | X | X | X | X | 5 | X | X | X | X |
| $W_2$    | 2 | X | 4 | X | X | X | 1 | 4 | X | X | X |
| $W_3$    | 3 | X | X | 3 | X | X | 2 | X | 3 | X | X |
| $W_4$    | 4 | X | X | X | 2 | X | 3 | X | X | 2 | X |
| $W_5$    | 5 | X | X | X | X | 1 | 4 | X | X | X | 1 |
| $W_6$    | X | 1 | 5 | X | X | X | X | 5 | X | X | X |
| $W_7$    | X | 2 | X | 4 | X | X | X | 1 | 4 | X | X |
| $W_8$    | X | 3 | X | X | 3 | X | X | 2 | X | 3 | X |
| $W_9$    | X | 4 | X | X | X | 2 | X | 3 | X | X | 2 |
| $W_{10}$ | X | X | 1 | 5 | X | X | X | X | 5 | X | X |
| $W_{11}$ | X | X | 2 | X | 4 | X | X | X | 1 | 4 | X |
| $W_{12}$ | X | X | 3 | X | X | 3 | X | X | X | 2 | 3 |
| $W_{13}$ | X | X | X | 1 | 5 | X | X | X | X | 5 | X |
| $W_{14}$ | X | X | X | 2 | X | 4 | X | X | X | 1 | 4 |
| $W_{15}$ | X | X | X | X | 1 | 5 | X | X | X | X | 5 |

The matrix specifies the wavelength assignment on one direction only. The wavelength assignment on the other direction will be exactly identical. This does not violate the CC constraint since the connections on the other direction are carried on a different fiber.

II.2 Case 2: Even Number of Nodes on the Ring

If N is an even number, when all connections are allocated in one direction only, the minimum number of wavelengths required for full mesh connectivity is shown in equation (2). However, by choosing the direction of the shortest path route for the longest connections, the minimum number of wavelengths required is given by equations (3) and (4). The analysis differentiates between the $N_{even}^e$ and $N_{even}^o$ cases:

Case 2a: $N=N_{even}^e$

A wavelength assignment scheme similar to the one used in the $N=N_{odd}$ case is used here as well. The longest connections are allocated first, using a new allocation scheme presented below, and $N_{even}^{e}/4$ wavelengths are assigned to these connections. The rest of the connections are allocated using a modified matrix approach:

(i) For all the longest connections, a new wavelength assignment scheme is defined that assigns wavelength $W_i$ for connections (j,k) and (k,j), on one direction as well as connections (j+1),(k+1) and (k+1),(j+1) on the other direction, wavelength $W_{(i+1)}$ for connections (j+2),(k+2) and (k+2),(j+2), on one direction, and connections (j+3),(k+3) and ((k+3),(j+3) on the other direction and so on. In general, the wavelength assignment algorithm alternates directions for alternating nodes on the ring and assigns to both pairs of connections (a connection pair is a pair (i,j), (j,i)) the same wavelength.

Because of the wavelength reuse, only as many wavelengths as half the number of connections ($N_{even}^{e}/4$) are needed to color all the longest connections without violating the CC constraint. The total number of wavelengths required to color all connections will then be equal to $W_{longest}^{e}$ in addition to the number of wavelengths required to color the remaining connections ($W_{remain}^{e}=(N_{even}^{e}-1)^2/8$).

Thus, $W_{even}^{e}=W_{longest}^{e}+W_{remain}^{e}=(N_{even}^{e})^2/8$.

(ii) The rest of the connections are assigned wavelengths using the following modified matrix approach:

Matrix Definitions for $N=N_{even}^{e}$

1. The matrix is of size ($W_{prev}^{o} \times N_{even}^{e}$) where $W_{prev}^{o}$ is the number of wavelengths for the previous odd case, calculated using equation (1), and $N_{even}^{e}$ is the number of nodes on the ring.

2. The values placed in the matrix range from 1 to ($L_{max}$-1), where $L_{max}$ represents the longest connection between any two nodes on the ring. The number $L_{max}$-1 represents the longest connection between any two nodes in the "previous odd" ($N_{prev}^{o}=N_{even}^{e}-1$) case.

3. A value K in position (i,j) states that node j is connected to node (j+K)mod ($N_{even}^{e}$) using wavelength $W_i$.

4. The symbol X in position (i,j) states that wavelength $W_i$ is not used for any of the connections starting from node j. The values placed in the matrix represent all but the longest connections, on one direction only, from each node to every other node. The same matrix rules as in Case 1 apply here as well. Clearly, filling matrix ($W_{prev}^{o} \times N_{even}^{e}$) following these rules, together with the new wavelength assignment scheme for the longest connections, corresponds to an optimal wavelength assignment supporting full mesh connectivity. The new matrix is now filled as follows:

Step 1: The previous odd matrix is filled using the cyclic shift method.

Step 2: A new column is added to the matrix at any arbitrary location.

Step 3: For each row, starting from the new column, the algorithm traverses the row towards the left (including wrap-around), until it encounters the first number entry (other than an X).

The new column is now filled using two simple rules:

Rule 1: If the number entry encountered, K, is less than the longest connection entry for the previous odd case $L_{max}^{prev(odd)}$, place an X at the new column and increment K by 1.

Rule 2: If the number entry encountered, K, equals $L_{max}^{prev(odd)}$, denote by the number Q the number of X's after the new column. The algorithm then places the number M=Q+1 at the new column and K now becomes K=K-Q TABLE III shows such a matrix for the $N_{even}^{e}=8$ case (column 5(E) is the new column in the matrix).

TABLE III

|   | A | B | C | D | E | F | G | H |
|---|---|---|---|---|---|---|---|---|
| $W_1$ | 1 | 3 | X | X | 1 | 3 | X | X |
| $W_2$ | 2 | X | 2→3 | X | X | 1 | 2 | X |
| $W_3$ | 3 | X | X | 1→2 | X | 2 | X | 1 |
| $W_4$ | X | 1 | 3→2 | X | 2 | X | 3 | X |
| $W_5$ | X | 2 | X | 2→3 | X | X | 1 | 2 |
| $W_6$ | X | X | 1 | 3→1 | 3 | X | X | 3 |

Figure 4:
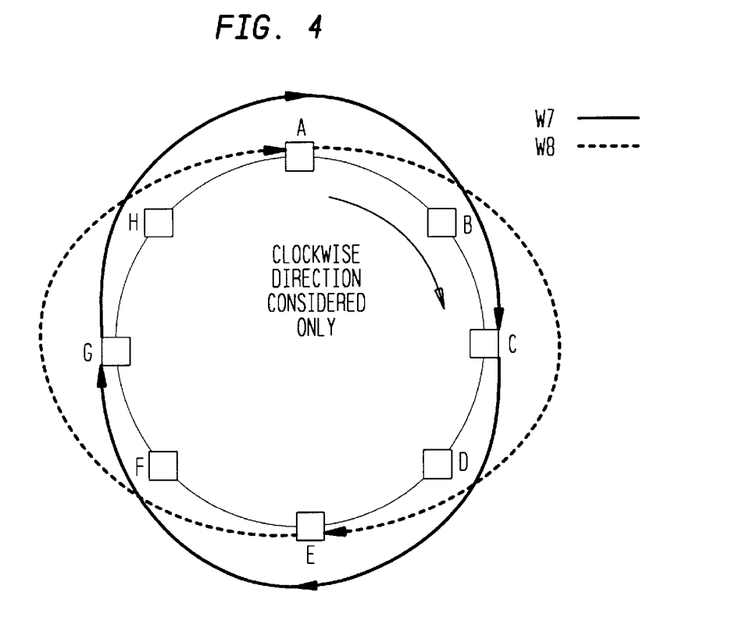
FIG. 4 illustrates the wavelength assignments for the longest connections for a ring with eight nodes (clockwise direction considered only)

In the matrix of TABLE III, all connections except the longest ones are allocated using 6 wavelengths (as many wavelengths as for the previous odd ($N_{prev}^{o}=7$)case). The allocation of half of the longest connections is shown in FIG. 4 (clockwise direction). The identical assignment is valid for all the other connections in the counter-clockwise direction.

Case 2b: $N=N_{even}^{o}$

Again, the wavelength assignment scheme allocates first the longest connections, and $(N_{even}^{o}-2)/4+1$ wavelengths are assigned to these connections. The rest of the connections are allocated using the same matrix approach as in the $N_{even}^{e}$ case.

The number of longest connections will again be equal to $N_{even}^{o}/2$, an odd number now. The new wavelength allocation scheme for the longest connections assigns the same wavelength to the longest connections in a single direction for "pairs of nodes" now, i.e., if it assigns wavelength $W_i$ for a longest connection from node k to node j, it also assigns the same wavelength for the longest connection from node j to node k. Since ($N_{even}^{o}/2$) is an odd number, after assigning all the "connection pairs", one more connection has to be assigned a wavelength. This connection can be any of the remaining connections. There are ($N_{even}^{o}-2$)/2 pairs. Half of them are assigned to the clockwise direction and the other half to the counter-clockwise direction. This results in a requirement of ($N_{even}^{o}-2$)/4 wavelengths. For the last ("unpaired") connection, an additional wavelength is needed. The total number of wavelengths required to color all the connections on the ring will then be equal to $W_{longest}^{o}$ (number of wavelengths to color the longest connections) in addition to the wavelengths required to color the remaining connections. Once again, the latter equals to the number of wavelengths needed for the "previous" odd case ($N_{prev}^{o}=N_{even}^{o}-1$). Thus, $$W_{even}^{o}=W_{longest}^{o}+W_{remain}^{o}=((N_{even}^{o})^2+4)/8.$$

TABLE IV shows the wavelength assignment matrix for the $N_{even}^{o}=6$ case (column 4(D) is the new column in the matrix).

TABLE IV

|   | A | B | C | D | E | F |
|---|---|---|---|---|---|---|
| $W_1$ | 1 | 2 | X | 1 | 2 | X |
| $W_2$ | 2 | X | 1→2 | X | 1 | 1 |
| $W_3$ | X | 1 | 2→1 | 2 | X | 2 |

Figure 5:
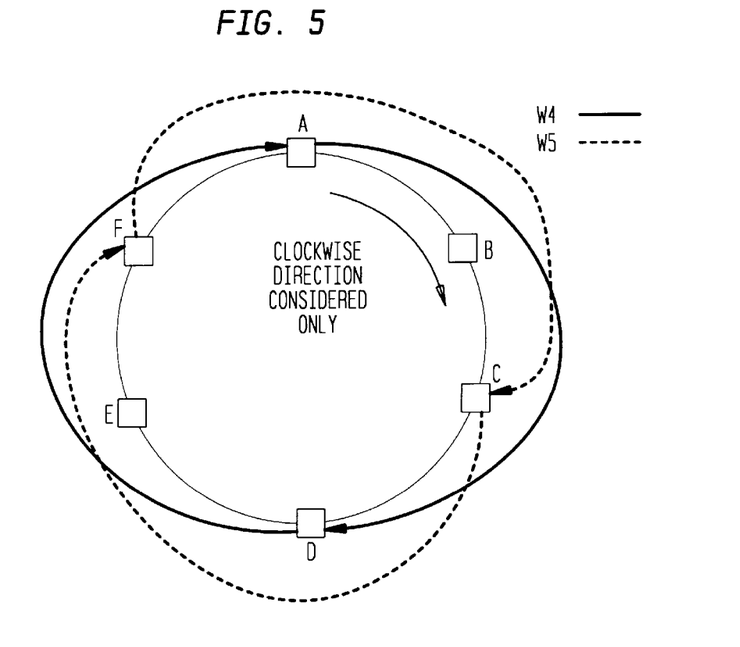
FIG. 5 illustrates the wavelength assignments for the longest connections for a ring with six nodes (clockwise direction considered only)

In addition, the longest connections assignment is shown in FIG. 5 for the clockwise direction. As before, the identical assignment is valid for all the other connections in the counter-clockwise direction.

III. Scalability Issues and the Matrix Approach

If the ring size increases, for the "new ring", the wavelength allocation algorithms presented in Section II can again find the new wavelength assignments for full mesh connectivity. It is desired initially to ascertain whether the size of the ring can be increased without having to reassign wavelengths to the already existing connections (the so-called recursive approach). There is a two-fold approach to the problem: (1) When the new nodes are added to specified locations on the ring, the wavelength assignment of the already existing connections cannot, in most cases, be maintained. A new matrix must be calculated, and corresponding wavelengths must then be assigned. (2) When the new nodes can be added at any position on the ring, however, the wavelength assignment of already existing connections can always be maintained provided the new nodes are added at appropriate locations. This is a desirable case since nodes already on the ring are not affected by the addition of the new nodes, and the new nodes are integrated seamlessly into the ring. The latter case is the one now presented.

Moreover, the interest initially focuses on the case wherein the number of nodes on the ring is incremented by 2, i.e., scaling the network from $N_{odd}$ to $N_{odd_{new}}$ or from $N_{even}$ to $N_{even_{new}}$.

Scaling by +2

Case 1. $N_{odd_{new}} = N_{odd} + 2$

The same matrix approach is used with the new matrix having the following characteristics:

1. The matrix is now of size $W_{odd_{new}} \times N_{odd_{new}}$ where $W_{odd_{new}}$ is the number of wavelengths (calculated using equation (1)) for $N = N_{odd_{new}}$ and $N_{odd_{new}} = N_{odd} + 2$ is the new number of nodes in the network.

2. The values placed in the matrix range from 1 to $L_{max}$, where $L_{max}$ represents the longest connection between any two nodes that exist on the "new" ring. This number equals $L_{max} = (N_{odd_{new}} - 1)/2$.

The matrix is now filled in as follows:

(i) The matrix is expanded from $W_{odd} \times N_{odd}$ to $W_{odd_{new}} \times N_{odd_{new}}$. The number of columns is increased by 2 and the number of rows is increased by $(N_{odd_{new}} - 1)/2$ to correspond to $W_{odd_{new}}$. The two new columns are "added" at positions k (k being any column number) (new column A) and $(k + L_{max_{prev}})$ (new column B) where $L_{max_{prev}}$ is the longest connection for the previous ring ($N = N_{odd}$).

(ii) For rows 1, . . . , $W_{odd}$ and all but the new columns, place the values calculated for previous matrix $W_{odd} \times N_{odd}$.

(iii) For rows 1, . . . , $W_{odd}$, place the value X in the new columns. By adding the X's at those positions, it is guaranteed that the previous connections maintain their previous wavelength assignments.

(iv) For rows 1, . . . , $W_{odd}$, backtracking from the first "new" column, the first value encountered that is not an X is incremented by 1. The same process repeats for the second "new" column. Note that while backtracking, it is possible to loop-around the matrix. By incrementing those values by 1, the connection (hop) number is increased to correspond to the new connection numbers (due to the insertion of the new nodes). Because of step (ii), there is never a new value greater than the allowable number of hops for the connections in the new ring.

(v) Steps (i), . . . , (iv) fill in the first $W_{odd}$ rows of the matrix. The rest of the rows are filled as follows:

(a) New columns A and B (rows $W_{odd+1} - W_{odd_{new}}$) are filled with values 1,2,3, . . . , $L_{max}$ in sequence.

(b) For all other columns (except new columns A and B), rows $W_{odd+1} - W_{odd_{new}}$ are filled with the missing hop number (hop number not used in rows 1, . . . , $W_{odd}$) for each column.

It is clear because the matrix is filled using the rules described above, again optimal wavelength assignment obtains while as the same time preserving the same wavelength assignment.

TABLE V shows an example of a new matrix when the number of nodes on the ring increases from 7 to 9. Columns 3(C) and 7(G) are the "new" columns, and rows 7–10 are "new" rows added to the matrix. The matrix is filled according to the immediately foregoing rules (i)–(v). The result is a "new" matrix with the same wavelength assignment as before for all the existing connections.

A similar approach is followed when the network scales from $N_{even}$ to $N_{even_{new}}$ (shown below).

TABLE V

|     | A | B | C | D | E | F | G | H | I |
|-----|---|---|---|---|---|---|---|---|---|
| $W_1$ | 1 | 4 | X | X | X | 4 | X | X | X |
| $W_2$ | 3 | X | X | 2 | X | 2 | X | 2 | X |
| $W_3$ | 4 | X | X | X | 1 | 3 | X | X | 1 |
| $W_4$ | X | 2 | X | 4 | X | X | X | 3 | X |
| $W_5$ | X | 3 | X | X | 3 | X | X | 1 | 2 |
| $W_6$ | X | X | X | 1 | 4 | X | X | X | 4 |
| $W_7$ | X | X | 1 | 3 | X | X | 1 | 4 | X |
| $W_8$ | X | X | 2 | X | 2 | X | 2 | X | 3 |
| $W_9$ | 2 | X | 3 | X | X | 1 | 3 | X | X |
| $W_{10}$ | X | 1 | 4 | X | X | X | 4 | X | X |

Case 2: $N_{even_{new}} = N_{even} + 2$

The new matrix is of size $W_{even_{new}} \times N_{even_{new}}$, and it is filled similarly to the $N_{odd_{new}}$ case. $W_{even_{new}}$ is composed of $W_{even}$ and $W_{new}$, and $W_{even}$ is further composed of $W_{prev_{odd}}$ and $W_{longest_{connection}}$. Rows 1, . . . , $W_{even}$ are filled from the previous matrix and the previous longest connection assignments, and the entries are appropriately incremented as explained before. The rest of the rows ($W_{new}$) are filled with the missing connection numbers. If the transition is from $N_{even_{even}}$ to $N_{even_{odd}}$, while filling in the $W_{new}$ rows, longest connection numbers have to be added to the new columns only. If the transition is from $N_{even_{odd}}$ to $N_{even_{even}}$, longest connection numbers do not have to be added to the new rows at all. This is due to the fact that the matrix shows only half of the longest connections (the other half are located in the opposite direction). When scaling the network from $N_{even_{odd}}$ to $N_{even_{even}}$, the number of longest connections after the entries in the matrix are appropriately incremented equals half the number of longest connections for the new network, and there is no need to add any more. When scaling the network from $N_{even_{even}}$ to $N_{even_{odd}}$, however, the number of longest connections after the entries in the matrix are appropriately incremented equals two less than half the number of longest connections for the new network, and thus two more longest connection entries have to be added to the matrix.

TABLE VI shows the new matrix when the number of nodes on the ring increases from 8 to 10. The new columns are now 3(C) and 8(H). Since the network scales from $N_{even_{even}}$ to $N_{even_{odd}}$, two longest connection entries were added to the new columns as previously explained.

TABLE VI

|     | A | B | C | D | E | F | G | H | I | J |
|-----|---|---|---|---|---|---|---|---|---|---|
| $W_1$ | 1 | 3 | X | X | 1 | 4 | X | X | X | 1 |
| $W_2$ | 3 | X | X | 3 | X | X | 4 | X | X | X |
| $W_3$ | 4 | X | X | X | 2 | X | 2 | X | 2 | X |
| $W_4$ | X | 4 | X | X | X | 1 | 3 | X | X | 2 |
| $W_5$ | X | 2 | X | 2 | X | 3 | X | X | 3 | X |
| $W_6$ | X | X | X | 1 | 4 | X | X | X | 1 | 4 |
| $W_7$ | X | X | 5 | X | X | X | X | 5 | X | X |

TABLE VI-continued

|  | A | B | C | D | E | F | G | H | I | J |
|---|---|---|---|---|---|---|---|---|---|---|
| $W_8$ | 5 | X | X | X | X | 5 | X | X | X | X |
| $W_9$ | X | X | 1 | 4 | X | X | X | 1 | 4 | X |
| $W_{10}$ | X | X | 2 | X | 3 | X | X | 2 | X | 3 |
| $W_{11}$ | 2 | X | 3 | X | X | 2 | X | 3 | X | X |
| $W_{12}$ | X | 1 | 4 | X | X | X | 1 | 4 | X | X |
| $W_{13}$ | X | X | 5 | X | X | X | X | 5 | X | X |

Scaling by +1

This subsection sets forth the more difficult case of adding a single node at a time at any location in the ring. When the size of the ring increases by one, the matrix approach may be used to scale the network while reassigning wavelengths to only a small number of the already-existing connections. The analysis differentiates between scaling rings with odd and even number of nodes. For both cases, the matrix scales from $\{W \times N\}$ to $\{W' \times (N+1)\}$. The manner in which the matrix is filled is as follows.

Case 1: N'=N+1 (N=odd number)

This new method scales a matrix with an odd number of nodes to a matrix with an even number of nodes while adding the new node at any location on the ring.

The matrix is expanded from $\{W \times N\}$ to $\{W' \times N'\}$ where $W=(N^2-1)/8$. The number of columns is increased 1 and the number of rows is increased to correspond to the new number of wavelengths required, $W'(W'=(N'^2)/8$ or $W'=[(N'^2+4)/8])$. For each row, from the new column, the algorithm traverses the row towards the left (including wrap-around) until it encounters the first entry (other than an X). The first W rows of the new column are then filled following rules 1 and 2 below. The rest of the rows are filled with the longest connection entries using a simple algorithm that places entry $L_{max}$ at location (i,j) if entry $L_{max}$ is not used in column j, and location (i,j) is empty (no X entry).

Rule 1: If the number entry encountered, K, is less than the longest connection entry for the previous odd case $L_{max}^{prev(odd)}$, place an X at the new column and increment K by 1.

Figure 6:
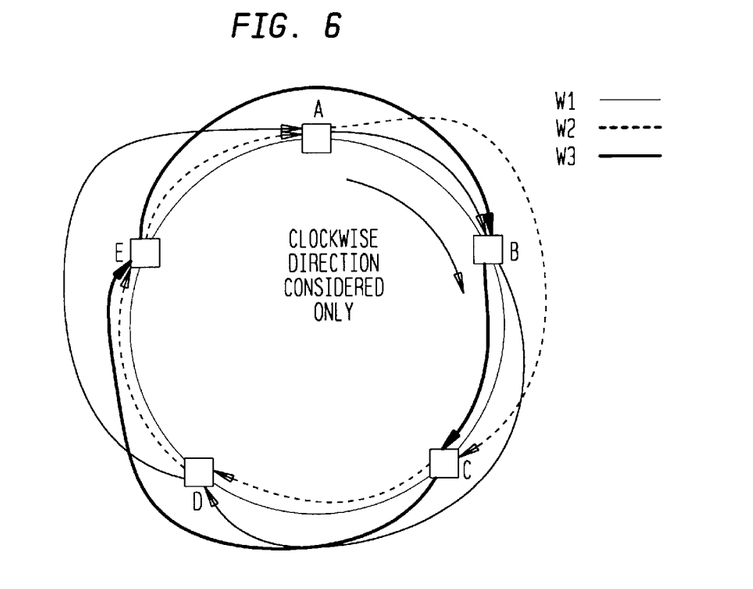
FIG. 6 illustrates the wavelength assignment for a ring with 5 nodes using the matrix assignment algorithm (clockwise direction considered only)
Figure 7:
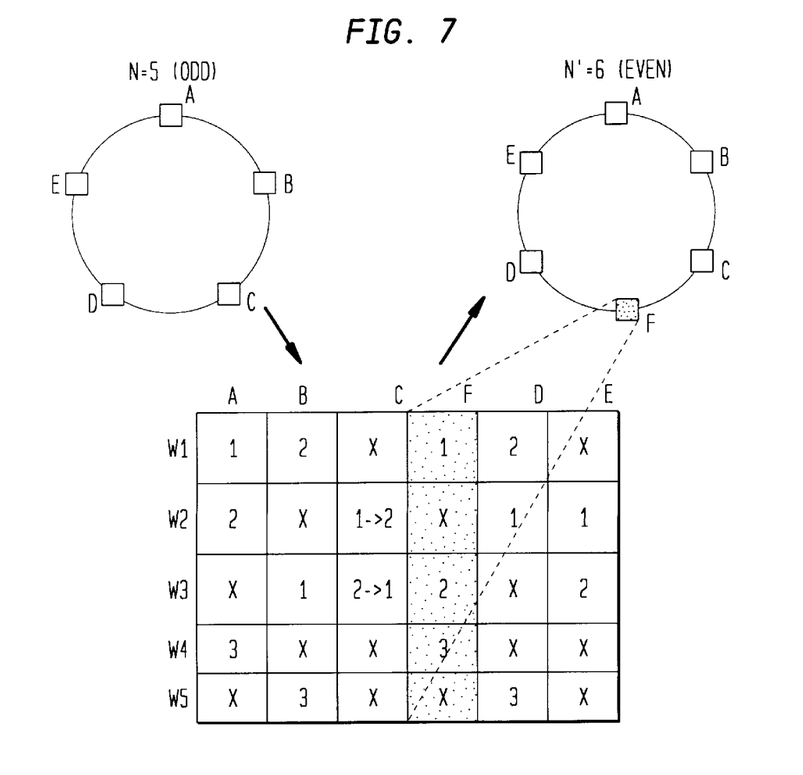
FIG. 7 illustrates the matrix table when an original network having five nodes is scaled to a new network with one added node.

Rule 2: If the entry encountered, K, equals $L_{max}^{prev(odd)}$, the algorithm places the number M=(Q+1) at the new column and entry K becomes K'=(K-Q). The number Q denotes the number of X's that follow the new column for that specific row. TABLE VII shows the wavelength assignment matrix for a 5-node ring with full mesh connectivity, and FIG. 6 shows the connectivity. TABLE VIII shows the new matrix when the number of nodes increases from N=5 to N'=6; FIG. 7 shows the relation of the new node to TABLE VIII. Column F is the new column and rows $W_4$-$W_5$ are the new rows added to the matrix. The resulting wavelength assignment is optimal while at the same time maintaining the same wavelength assignment all but three of the existing connections on the ring.

TABLE VII

|  | A | B | C | D | E |
|---|---|---|---|---|---|
| $W_1$ | 1 | 2 | X | 2 | X |
| $W_2$ | 2 | X | 1 | 1 | 1 |
| $W_3$ | X | 1 | 2 | X | 2 |

TABLE VIII

|  | A | B | C | F | D | E |
|---|---|---|---|---|---|---|
| $W_1$ | 1 | 2 | X | 1 | 2 | X |
| $W_2$ | 2 | X | 1→2 | X | 1 | 1 |
| $W_3$ | X | 1 | 2→1 | 2 | X | 2 |
| $W_4$ | 3 | X | X | 3 | X | X |
| $W_5$ | X | 3 | X | X | 3 | X |

Case 2: N'=N+1 (N=even number)

The analysis also considers the case of scaling a matrix with an even number of nodes to a matrix with an odd number of nodes. As before, the new column (representing the new node) can be added at any location in the matrix.

The matrix is now expanded from $\{W \times N\}$ to $\{W' \times N'\}$ where $(W'=((N')^2-1)/8)$. For the new column, for rows $1, \ldots, ((N-1)^2-1)/8$, the algorithm follows Rule 1 as defined above. For rows $[((N-1)^2-1)/8]+1, \ldots, W$ (where W equals to the number of wavelengths for $N=N_{even}(W=N^2/8$ if $N=N_{even}^e$ or $W=(N^2+4)/8$ if $N=N_{even}^o$)) the algorithm follows Rule 2. For rows (W+1), ..., W', the algorithm places in the new column the connection entries that are not used in the rows above for that column in a sequential order. The rest of the row entries are filled using a simple algorithm that places entry K at location (i,j) if entry K is not used in column j, and location (i,j) is empty (no X entry).

Figure 8:
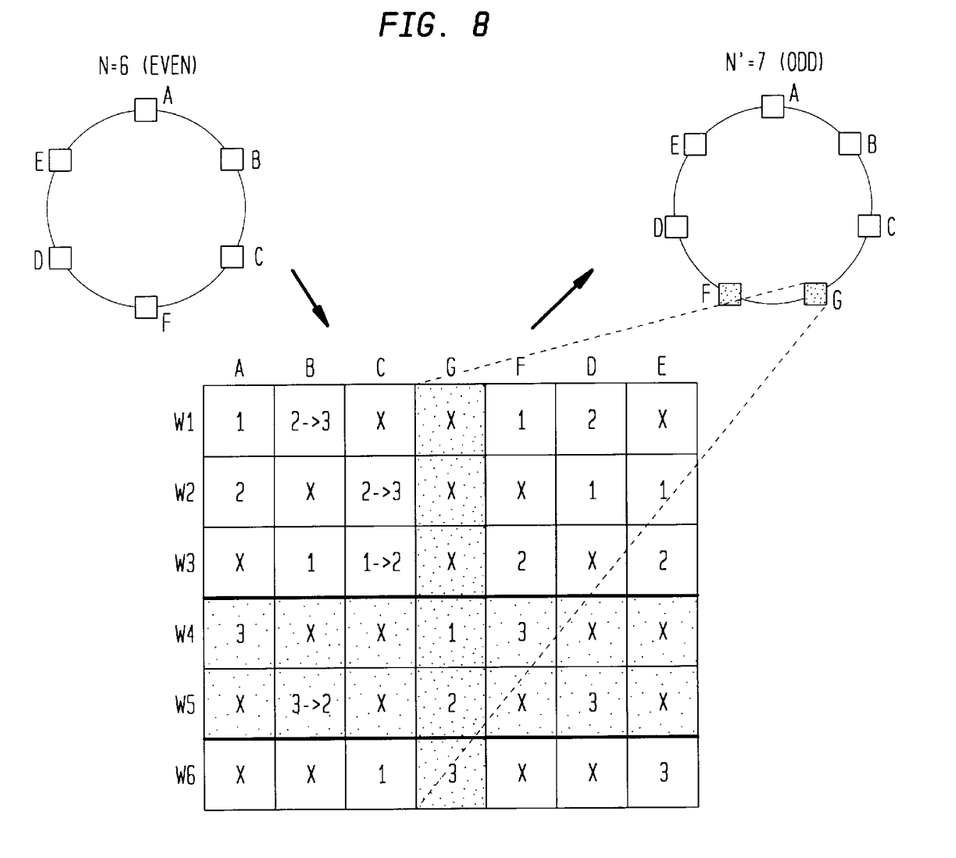
FIG. 8 illustrates the matrix table when an original network having six nodes is scaled to a new network with one added node.

TABLE IX shows an example of the new matrix when the number of nodes on the ring increases from N=6 to N'=7; FIG. 8 shows the relation of the new node to TABLE IX. Column G is the new column and $W_6$ is the new row added to the matrix.

TABLE IX

|  | A | B | C | G | F | D | E |
|---|---|---|---|---|---|---|---|
| $W_1$ | 1 | 2→3 | X | X | 1 | 2 | X |
| $W_2$ | 2 | X | 2→3 | X | X | 1 | 1 |
| $W_3$ | X | 1 | 1→2 | X | 2 | X | 2 |
| $W_4$ | 3 | X | X | 1 | 3 | X | X |
| $W_5$ | X | 3→2 | X | 2 | X | 3 | X |
| $W_6$ | X | X | 1 | 3 | X | X | 3 |

IV. Modular Approach

This section presents another illustrative wavelength assignment algorithm which assigns wavelengths to all connections of the ring so that no CC constraint violation occurs. It also is shown how the network scales when two (or four) new nodes are added to the ring at a time. Again, there is a differentiation between the cases of odd and even number of nodes on the ring.

IV.1 Odd number of nodes on the ring ($N=N_{odd}$)

The wavelength assignment algorithm is one that depends upon the assignment of a ring with ($N_{odd}$-2) nodes in order to obtain the wavelength of a ring with $N_{odd}$ nodes. However, in order to obtain the assignment for the ($N_{odd}$-2) case, knowledge of the ($N_{odd}$-4) case is required, and so forth. Thus, the algorithm starts from the simple case of $N_{odd}$=3 and continues to find the wavelength for the $N_{odd}$=5, 7, 9, ..., cases. The algorithm maintains the wavelength assignment for the ($N_{odd}$-2) case, and uses "new" wavelengths to accommodate the connections created due to the addition of two new nodes on the ring. Therefore, solving the wavelength assignment problem also solves the scalability problem (when two new nodes are added to the network at specified locations) at a time), while maintaining the same wavelength assignment for the connections between already existing nodes on the ring. The wavelength assignment algorithm is as follows:

(1) Start with a ring having K=3 nodes.

(2) Add two new nodes on the ring at locations i and $[i+((N_{odd}-1)/2)]$, respectively, where $N_{odd}$ corresponds to the new number of nodes on the ring.

(3) Use $(N_{odd}-1)/2$ extra wavelengths to color all new connections on the ring (created by the addition of the two new nodes). This is done as follows:

Assume that the two new nodes are placed at locations i, $[i+((N_{odd}-1)/2)]$ on the ring—these two nodes are indicated as (K+1) and (K+2). The ring is separated into two regions— these regions range from 1 to (K+1)/2 (Region 1), and from (K+3)/2 to K (Region 2). Using only the clockwise direction only, connections are made between the new nodes and the nodes in the two regions as follows:

(3a) Region 1: On the shortest path, assign wavelength $W_1$ from node (K+1) to node 1, wavelength $W_2$ from node (K+1) to node 2, ..., wavelength $W_{K+1}/2$ from node (K+1) to node (K+1)/2. Similarly, on the shortest path, assign wavelength $W_1$ from node 1 to node (K+2), wavelength $W_2$ from node 2 to node (K+2), ..., wavelength $W_{K+1}/2$ from node (K+1)/2 to node (K+2).

(3b) Region 2: On the shortest path, assign wavelength $W_1$ from node (K+3)/2 to node (K+1), wavelength $W_2$ from node $[(K+3)/2+1]$ to node (K+1), ..., wavelength $W_{K-1}/2$ from node K to node (K+1). Similarly, on the shortest path, assign wavelength $W_1$ from node (K+2) to node (K+3)/2, wavelength $W_2$ from node (K+2) to node $[(K+3)/2+1]$, ..., wavelength $W_{K-1}/2$ from node (K+2) to node K.

(3c) Finally, the two new nodes are connected together in a full mesh. Wavelength $W_{K+1}/2$ is assigned (on the shortest path) from node (K+1) to node (K+2) in the clockwise direction. This is the only connection between the two new nodes.

(4) Go back to step (2). Repeat the procedure until the desired number of nodes $N_{odd}$ has been reached.

Figure 2A:
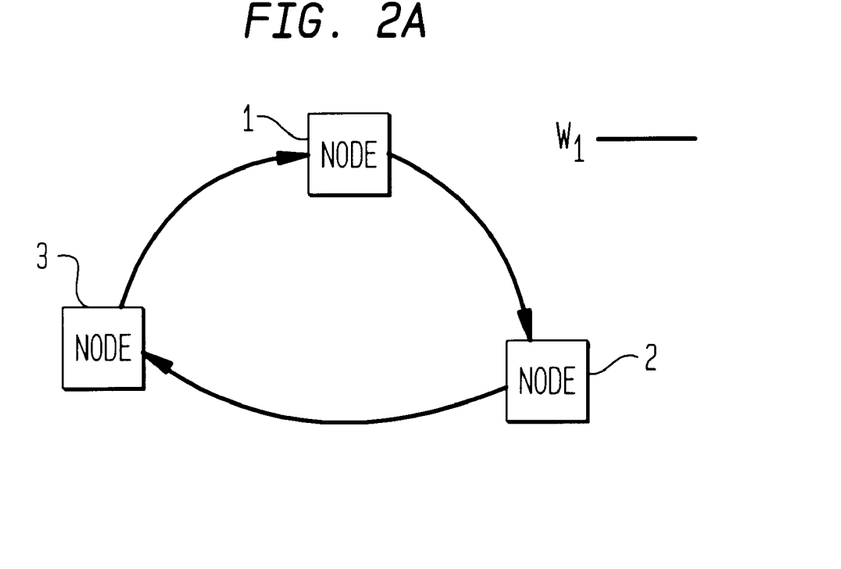
Figure 2B:
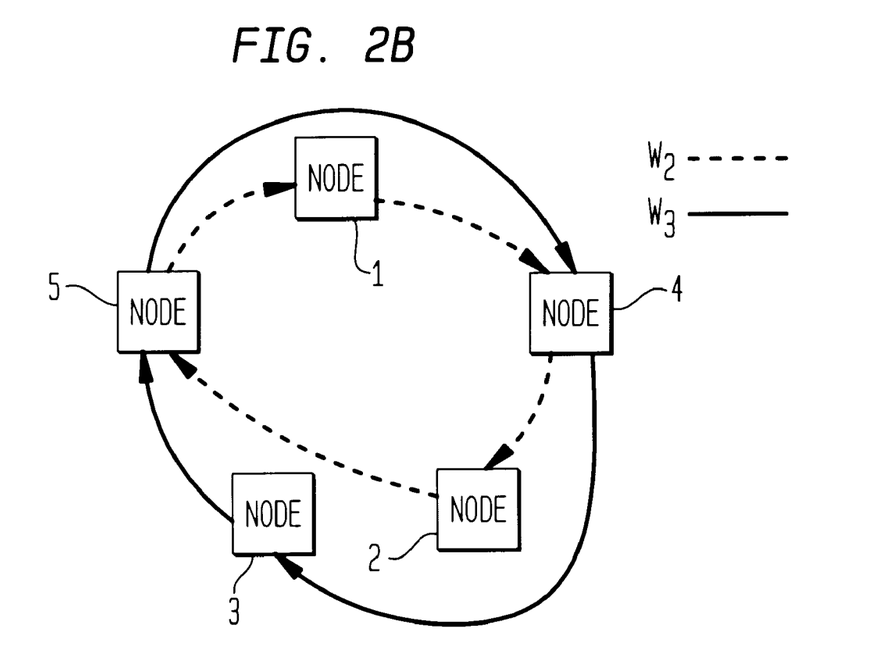
FIG. 2B illustrates the additional wavelength assignment as the number of nodes of FIG. 2A increases from three to five nodes (clockwise direction only)

The rings in FIGS. 2A and 2B, presented earlier for pedagogical purposes, illustrate the case of increasing the ring network from three to five nodes using the above algorithm, that is, adding/scaling the network from three to five nodes.

IV.2 Even Number of Nodes on the Ring (N=$N_{even}$)

For the case of an even number of nodes on the ring, the algorithms differentiate between the $N_{even}^e$ and $N_{even}^o$ cases.

Case IV.2a: $N_{even}^e$

A similar wavelength assignment algorithm as in Case IV.1 is used here as well. The wavelength assignment algorithm depends on the wavelength assignment of a ring with ($N_{even}^e$ 31 4) nodes in order to obtain the wavelength assignment for a ring with $N_{even}^e$ nodes. Thus, the algorithm starts with the simple case of K=4 and continues to find the wavelength assigrnents for K=8,12,16, ..., case. Again, the algorithm maintains the wavelength assignment for the ($N_{even}^e-4$) case and uses "new" wavelengths to accommodate the connections created because of the addition of four new nodes on the ring. Based upon the teachings of Case IV.1, the algorithm for the case of $N_{even}^e$ nodes is straightforward:

(1) Start with the trivial case of K=4.

(2) Divide the K nodes into 4 equal regions. These regions range from 1 to K/4 (Region 1), from (K/4+1) to K/2 (Region 2), from (K/2+1) to 3K/4 (Region 3) and from (3K/4+1) to K (Region 4). The four new nodes are placed at locations i, (i+K/4), (i+2K/4), (i+3K/4) on the ring. The four new nodes are indicated as (K+1), (K+2), (K+3) and (K+4).

(3) Using only the clockwise direction only, connections are made between the new nodes and the nodes in the four regions as follows:

(3a) We start by assigning connections between new nodes (K+1) and (K+2) and the 4 regions:

(3a.1) Region 1: On shortest path assign wavelength $\lambda_1$ from node (K+1) to node 1, wavelength $\lambda_2$ from node (K+1) to node 2, ..., wavelength $\lambda_{K/4}$ from node (K+1) to node K/4. Similarly, on shortest path, assign wavelength $\lambda_1$ from node 1 to node (K+2), wavelength $\lambda_2$ from node 2 to node (K+2), ..., wavelength $\lambda_{k/4}$ from node K/4 to node (K+2).

(3a.2) Region 4: On shortest path assign wavelength $\lambda_1$ from node K to node (K+1), wavelength $\lambda_2$ from node (K-1) to node (K+1), ..., wavelength $\lambda_{k/4}$ from node (3K/4+1) to node (K+1). Similarly, on shortest path, assign wavelength $\lambda_1$ from node (K+2) to node K, wavelength $\lambda_2$ from node (K+2) to node (K-1), ..., wavelength $\lambda_{K/4}$ from node (K+2) to node (3K/4+1). Note that the wavelengths used in this step were also used in Step (3a.1) since the connections are in different regions and do not overlap.

(3a.3) Region 2: On shortest path assign wavelength $\lambda_{k/4+1}$ from node (K+1) to node (K/4+1), wavelength $\lambda_{K/4+2}$ from node (K+1) to node (K/4+2), wavelength $\lambda_{K/2}$ from node (K+1) to node K/2. Similarly, on shortest path, assign wavelength $\lambda_{K/4+1}$ from node (K/4+1) to node (K+2), wavelength $\lambda_{K/4+2}$ from node (K/4+2) to node (K+2), ..., wavelength $\lambda_{K/2}$ from node K/2 to node (K+2).

(3a.4) Region 3: On shortest path assign wavelength $\lambda_{K/4+1}$ from node 3K/4 to node (K+1), wavelength $\lambda_{K/4+2}$ from node (3K/4-1) to node (K+1), ..., wavelength $\lambda_{K/2}$ from node (K/2+1) to node (K+1). Similarly, on shortest path, assign wavelength $\lambda_{K/4+1}$ from node (K+2) to node 3K/4, wavelength $\lambda_{K/4+2}$ from node (K+2) to node (3K/4-1), ..., wavelength $\lambda_{K/2}$ from node (K+2) to node (K/2+1). Again, note that the wavelengths used in this step were also used in Step (3a.3) since the connections are in different regions and do not overlap.

(3b): We continue by assigning connections between new nodes (K+3) and (K+4) and the 4 regions:

(3b.1) Region 3: On shortest path assign wavelength $\lambda_{K/2+1}$ from node (K+3) to node (K/2+1), wavelength $\lambda_{K/2+2}$ from node (K+3) to node (K/2+2), ..., wavelength $\lambda_{3K/4}$ from node (K+3) to node 3K/4. Similarly, on shortest path, assign wavelength $\lambda_{K/2+1}$ from node (K/2+1) to node (K+4), wavelength $\lambda_{K/2+2}$ from node (K/2+2) to node (K+4), ..., wavelength $\lambda_{3K/4}$ from node 3K/4 to node (K+4).

(3b.2) Region 4: On shortest path assign wavelength $\lambda_{K/2+1}$ from node K to node (K+3), wavelength $\lambda_{K/2+2}$ from node (K-1) to node (K+3), ..., wavelength $\lambda_{3K/4}$ from node (3K/4+1) to node (K+3). Similarly, on shortest path, assign wavelength $\lambda_{K/2+1}$ from node (K+4) to node K, wavelength $\lambda_{K/2+2}$ from node (K+4) to node (K-1), ..., wavelength $\lambda_{3K/4}$ from node (K+4) to node (3K/4+1). Note that the wavelengths used in this step were also used in Step (3b.1) since the connections are in different regions and do not overlap.

(3b.3) Region 1: On shortest path, assign wavelength $\lambda_{3K/4+1}$ from node K/4 to node (K+3), wavelength $\lambda_{3K/4+2}$ from node (K/4-1) to node (K+3), ..., wavelength $\lambda_K$ from node 1 to node (K+3). Similarly, on shortest path, assign wavelength $\lambda_{3K/4+1}$ from node (K+4) to node K/4, wavelength $\lambda_{3K/4+2}$ from node (K+4) to node (K/4-1), ..., wavelength $\lambda_K$ from node (K+4) to node 1.

(3b.4) Region 2: On shortest path, assign wavelength $\lambda_{3K/4+1}$ from node (K+3) to node (K/4+1), wavelength $\lambda_{3K/4+2}$ from node (K+3) to node (K/4+2), . . . , wavelength $\lambda_K$ from node (K+3) to node K/2. Similarly, on shortest path, assign wavelength $\lambda_{3K/4+1}$ from node (K/4+1) to node (K+4), wavelength $\lambda_{3K/4+2}$ from node (K/4+2) to node (K+4), . . . , wavelength $\lambda_K$ from node K/2 to node (K+4). Again, note that the wavelengths used in this step were also used in Step (3b.3) since the connections are in different regions and do not overlap.

(3c) Finally, we need to connect the new nodes in full mesh. We can assign on shortest paths wavelength $\lambda_{K+1}$ clockwise from node (K+1) to node (K+2) and from node (K+2) to node (K+1), wavelength $\lambda_{K+1}$ counter-clockwise from node (K+3) to node (K+4) and from node (K+4) to node (K+3). Similarly, we can assign on shortest paths wavelength $\lambda_{K+2}$ in the clockwise direction from node (K+1) to (K+3) and in the counter-clockwise direction from node (K+3) to node (K+1), wavelength $\lambda_{K+2}$ in the clockwise direction from node (K+3) to node (K+2) and in the counter-clockwise direction from node (K+2) to node (K+3), wavelength $\lambda_{K+2}$ in the clockwise direction from node (K+2) to node (K+4) and in the counter-clockwise direction from node (K+4) to node (K+2), and wavelength $\lambda_{K+2}$ in the clockwise direction from node (K+4) to node (K+1) and in the counter-clockwise direction from node (K+1) node to (K+4).

(4) Go back to step (2). Repeat the procedure until the desired number of nodes $N_{even}^e$ has been reached.

Case IV.2b: $N_{even}^o$

When $N=N_{even}^o$, a variation of the algorithm for the $N_{even}^e$ case is used. Once again, the number of nodes is incremented by 4, but this is done in two phases. In the first phase, the number of nodes on the ring is incremented by 2, and the wavelength assignment for the new connections is made following a similar wavelength assignment algorithm as in Case IV.2a. Two more nodes are then added to the ring and the same wavelength assignment process is repeated. This process is as follows:

(1) Start with the trivial case of K=6.

(2) Add two nodes at locations ((K+2)/4+1) (node A) and (3(K+2)/4+1) (node B). The number of nodes in the network is now (K+2). After the addition of the two nodes, divide the (K+2) nodes into 2 equal regions. These regions range from (3(K+2)/4+2) to (K+2)/4 (Region 1) and from ((K+2)/4+2) to 3(K+2)/4 Region 2). The new nodes are not included in the 2 regions.

(3) Using only the clockwise direction only, connections are made between the new nodes and the nodes in the two regions as follows:

(3a) Region 1: On shortest path, assign wavelength $\lambda_1$ from node (K+2)/4 to node A, wavelength $\lambda_2$ from node ((K+2)/4−1) to node A, . . . , wavelength $\lambda_{K/2}$ from node (3(K+2)/4+2) to node A. Similarly, on shortest path, assign wavelength $\lambda_1$ from node B to node (K+2)/4, wavelength $\lambda_2$ from node B to node ((K+2)/4−1), . . . , wavelength $\lambda_{K/2}$ from node B to node (3(K+2)4+2).

(3b) Region 2: On shortest path assign wavelength $\lambda_1$ from node A to node ((K+2)/4+2), wavelength 2 from node A to node ((K+2)/4+3), . . . , wavelength $\lambda_{K/2}$ from node A to node 3(K+2)/4. Similarly on shortest path assign wavelength $\lambda_1$ from node ((K+2)/4+2) to node B, wavelength $\lambda_2$ from node ((K+2)/4+3) to node B, . . . , wavelength $\lambda_{K/2}$ from node 3(K+2)/4 to node B. Note that the wavelengths used here are the same wavelengths as the ones used in Step (3a) since the connections are in different regions and do not overlap.

(3c) Finally, we need to connect the new nodes in full mesh. We can assign (on shortest path) wavelength $\lambda_{(K+2)/2}$ from node A to node B in the clockwise direction and from node B to node A in the clockwise direction.

(4) Replace K+2 by K" and repeat Steps 2–3 after the addition of two new nodes A' and B' to the ring.

(5) Go back to step (2). Repeat the procedure until the desired number of nodes $N_{even}^o$ has been reached.

V. Network Aspects for Connection Set-up and Routing

Figure 9:
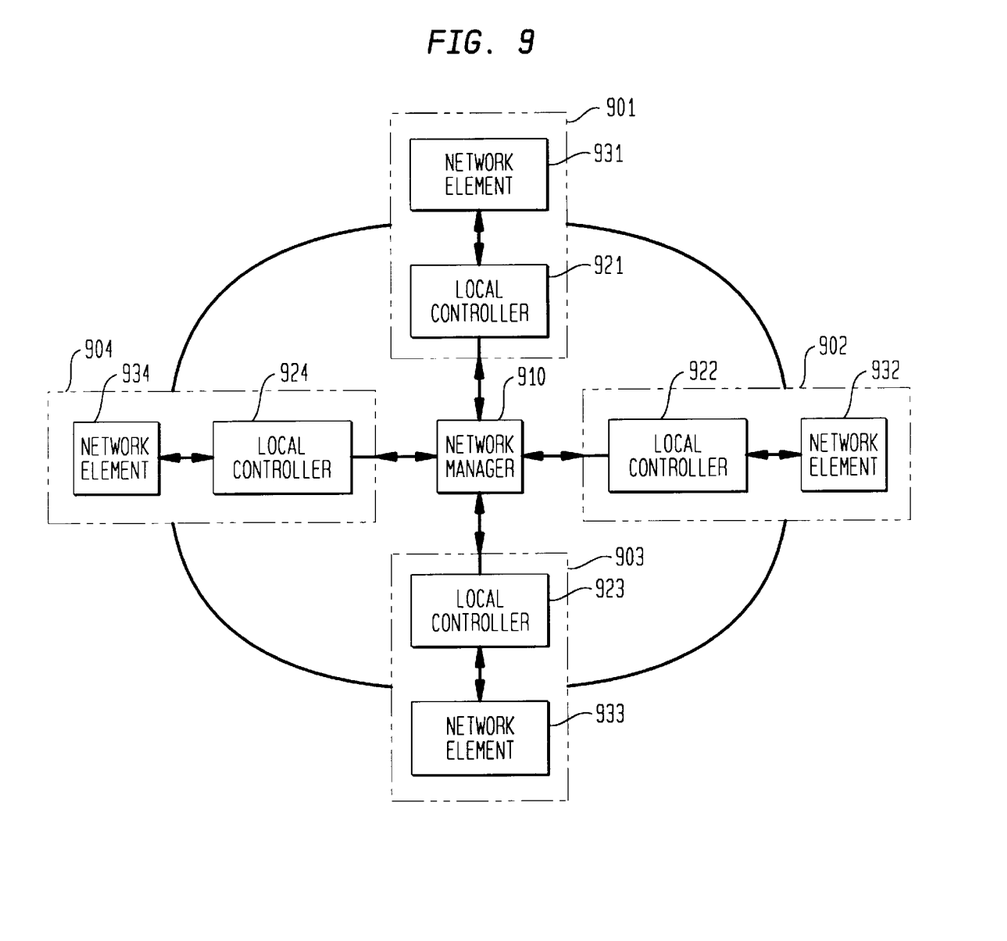
FIG. 9 illustrates the network configuration. Each network node comprises of a network element and a local controller. A network manager is interacting with the local controllers in order to establish the connection set-up and the routing of the traffic in the ring network.

With reference to FIG. 9, there is shown a high-level block diagram of network manager 910 interacting with local controllers 921, 922, 923, and 924 and associated with network elements 931, 932,933, and 934, respectively; network element 931 and local controller 921 comprise node 901, network element 932 and local controller 922 comprise node 902, and so forth. Network manager 910, although shown as a stand-alone component, may also be co-located with or be an integral part of any one of the nodes. Network manager 910 stores the prescribed wavelength assignment algorithm, whether the matrix algorithm or modular algorithm in accordance with the present invention. Moreover, network manager 910 computes the assignment algorithm, as needed, to set-up all appropriate connections in the network. For example, the working nodes on the ring are registered with network manager 910 via the corresponding local controller/network element, and manager 910 computes the wavelength assignments for the ring based upon the number of active nodes. Then each respective ones of the local controllers is notified of the wavelength assignments and, in turn, the network elements are activated to implement the wavelength assignments. As traffic is to be routed from one node to another, this traffic is forwarded over the corresponding wavelength assigned to carry the traffic from the first node to the second node is accordance with the wavelength assignments.

Figure 10:
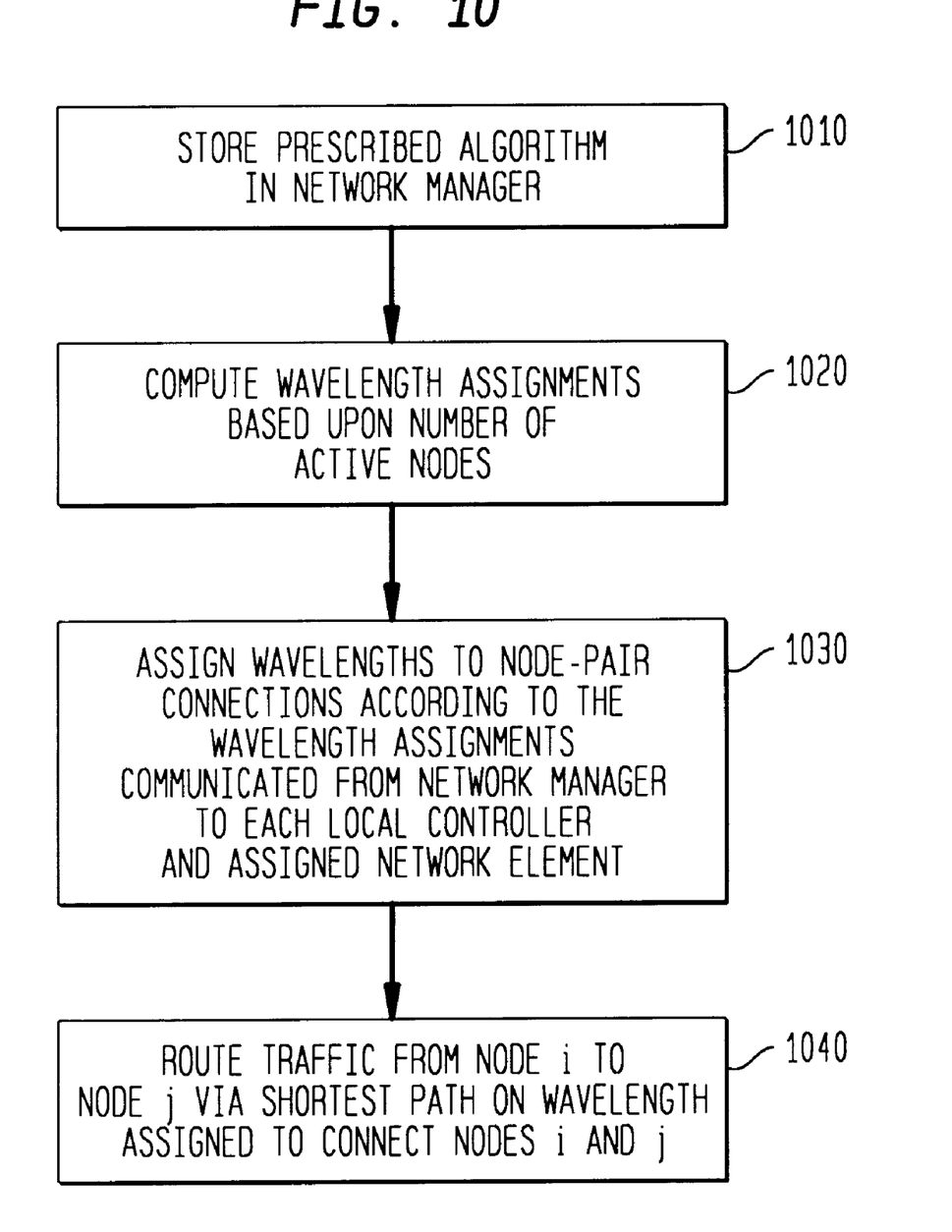
FIG. 10 is a high-level flow diagram of the method carried out by the network manager, in conjunction with the local controller and network element, for both the wavelength assignment and routing functions in the ring network.

The flow diagram of FIG. 10 depicts the methodology carried out by the structure of FIG. 9, as alluded to in the foregoing description of FIG. 9. Thus, network manager 910 has stored, upon its initialization or by downloading, as the case may be, the prescribed wavelength assignment algorithm; this is depicted by processing block 1010. The algorithm is use to compute, as per processing block 1020, the wavelength assignments for the number of nodes on the ring that are registered as being active. Once computed, as now depicted by processing block 1030, each network elements 931, . . . , or 934 is configured to interconnect with the other network elements as determined by the computation of the assignment algorithm. Upon configuration, as evoked by processing block 1040, traffic is routed among the nodes in correspondence to the assigned connections.

Although various embodiments which incorporate the teachings of the present invention have been shown and described in detail herein, those skilled in the art can readily devise many other varied embodiments that still incorporate these teachings.

What is claimed is:

1. A method for physically implementing a wavelength division multiplexing network composed of clockwise and counterclockwise rings interconnecting a plurality of nodes with wavelength connections wherein each of the connections couples a node pair, the method comprising the steps of systematically selecting, based upon a prescribed mathematical algorithm, a wavelength assignment for each of the node pair connections, wherein the algorithm satisfies known grade-of-service constraints for the network and said step of selecting includes the step of minimizing the number of assigned wavelengths as one of the grade-of-service constraints, and interconnecting each node pair with the corresponding assigned wavelength.

2. The method as recited in claim 1 wherein the network propagates optical signals and said step of selecting includes the step of routing the optical signals using shortest-path routing as another of the grade-of-service constraints.

3. The method as recited in claim 2 wherein said step of selecting includes the step of assigning wavelengths to each fiber so that optical signals on the same fiber have different wavelengths as yet another of the grade-of-service constraints.

4. The method as recited in claim 3 wherein said step of selecting includes the step of dedicating one wavelength per connection as still another grade-of-service constraint.

5. A method for physically implementing a wavelength division multiplexing network composed of clockwise and counterclockwise rings interconnecting a plurality of nodes with wavelength connections wherein each of the connections couples a node pair, the method comprising the steps of systematically selecting, based upon a prescribed mathematical algorithm, a wavelength assignment for each of the node pair connections, the algorithm satisfying known grade-of-service constraints for the network wherein the prescribed algorithm includes a matrix algorithm and said step of selecting includes the step of computing the wavelength assignment using the matrix algorithm, and interconnecting each node pair with the corresponding assigned wavelength.

6. A method for physically implementing a wavelength division multiplexing network composed of clockwise and counterclockwise rings interconnecting a plurality of nodes with wavelength connections wherein each of the connections couples a node pair, the method comprising the steps of systematically selecting, based upon a prescribed mathematical algorithm, a wavelength assignment for each of the node pair connections, the algorithm satisfying known grade-of-service constraints for the network wherein the prescribed algorithm includes a modular algorithm and said step of selecting includes the step of computing the wavelength assignment using the modular algorithm, and interconnecting each node pair with the corresponding assigned wavelength.

7. A method for physically implementing a wavelength division multiplexing network composed of clockwise and counterclockwise rings interconnecting a plurality of nodes with wavelength connections wherein each of the connections couples a node pair, the method comprising the steps of systematically selecting, based upon a prescribed mathematical algorithm, a wavelength assignment for each of the node pair connections, the algorithm satisfying known grade-of-service constraints for the network wherein the prescribed algorithm includes a scaling algorithm and said step of selecting includes the step of computing the wavelength assignment using the scaling algorithm whenever it is required to increase the number of nodes on the ring, and interconnecting each node pair with the corresponding assigned wavelength.

8. A method for physically implementing a wavelength division multiplex network composed of two oppositely-directed fiber rings interconnecting a plurality of nodes with a plurality of wavelength connections wherein each of the connections couples a node pair and such that the network is fully-connected, the network propagating optical signals, the method comprising the steps of systematically determining, based upon a prescribed mathematical algorithm, a wavelength assignment for each of the wavelength connections and the corresponding node pair interconnected by the assigned wavelength, and interconnecting each node pair with the corresponding assigned wavelength, said step of determining including the steps of
minimizing the number of assigned wavelengths,
assigning wavelengths to each fiber so that optical signals on the same fiber do not have the same wavelength,
dedicating one wavelength per connection, and
routing the information using shortest-path routing.

9. The method as recited in claim 8 wherein the prescribed algorithm includes a matrix algorithm and said step of determining further includes the step of computing the wavelength assignment using the matrix algorithm.

10. The method as recited in claim 8 wherein the prescribed algorithm includes a modular algorithm and said step of determining further includes the step of computing the wavelength assignment using the modular algorithm.

11. A system for physically implementing a wavelength division multiplexing network composed of clockwise and counterclockwise rings interconnecting a plurality of nodes with wavelength connections wherein each of the connections couples a node pair, the system comprising manager means, coupled to the nodes, for systematically selecting, based upon a prescribed mathematical algorithm, a wavelength assignment for each of the wavelength connections and the corresponding node pair interconnected by the assigned wavelength, the algorithm satisfying known grade-of-service constraints for the network, wherein said means for systematically selecting includes means for minimizing the number of assigned wavelengths as one of the grade-of-service constraints, and controller means, responsive to the manager means and coupled to the nodes, for interconnecting each node pair with the corresponding assigned wavelength.

12. The system as recited in claim 11 wherein the network propagates optical signals and said manager means includes means for routing the optical signals using shortest-path routing as another of the grade-of-service constraints.

13. The system as recited in claim 12 wherein said means for selecting includes means for assigning wavelengths to each fiber so that optical signals on the same fiber have different wavelengths as yet another of the grade-of-service constraints.

14. The system as recited in claim 13 wherein said means for selecting includes means for dedicating one wavelength per connection as still another grade-of-service constraint.

15. A system for physically implementing a wavelength division multiplexing network composed of clockwise and counterclockwise rings interconnecting a plurality of nodes with wavelength connections wherein each of the connections couples a node pair, the system comprising manager means, coupled to the nodes, for systematically selecting, based upon a prescribed mathematical algorithm, a wavelength assignment for each of the wavelength connections and the corresponding node pair interconnected by the assigned wavelength, the algorithm satisfying known grade-of-service constraints for the network, wherein the prescribed algorithm includes a matrix algorithm and said means for selecting includes the step of computing the wavelength assignment using the matrix algorithm, and controller means, responsive to the manager means and coupled to the nodes, for interconnecting each node pair with the corresponding assigned wavelength.

16. A system for physically implementing a wavelength division multiplexing network composed of clockwise and counterclockwise rings interconnecting a plurality of nodes with wavelength connections wherein each of the connections couples a node pair, the system comprising manager means, coupled to the nodes, for systematically selecting, based upon a prescribed mathematical algorithm, a wavelength assignment for each of the wavelength connections and the corresponding node pair interconnected by the assigned wavelength, the algorithm satisfying known grade-of-service constraints for the network, wherein the prescribed algorithm includes a modular algorithm and said means for selecting includes means for computing the wavelength assignment using the modular algorithm, and controller means, responsive to the manager means and coupled to the nodes, for interconnecting each node pair with the corresponding assigned wavelength.

17. A system for physically implementing a wavelength division multiplexing network composed of clockwise and counterclockwise rings interconnecting a plurality of nodes with wavelength connections wherein each of the connections couples a node pair, the system comprising manager means, coupled to the nodes, for systematically selecting, based upon a prescribed mathematical algorithm, a wavelength assignment for each of the wavelength connections and the corresponding node pair interconnected by the assigned wavelength, the algorithm satisfying known grade-of-service constraints for the network, wherein the prescribed algorithm includes a scaling algorithm and said means for selecting includes means for computing the wavelength assignment using the scaling algorithm whenever it is required to increase the number of nodes on the ring, and controller means, responsive to the manager means and coupled to the nodes, for interconnecting each node pair with the corresponding assigned wavelength.

\* \* \* \* \*